US010612359B2

(12) United States Patent
Zheng et al.

(10) Patent No.: US 10,612,359 B2
(45) Date of Patent: Apr. 7, 2020

(54) DRILLING CONTROL SYSTEM AND METHOD WITH ACTUATOR COUPLED WITH TOP DRIVE OR BLOCK OR BOTH

(71) Applicant: Schlumberger Technology Corporation, Sugar Land, TX (US)

(72) Inventors: Shunfeng Zheng, Katy, TX (US); Jacques Orban, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 160 days.

(21) Appl. No.: 14/754,901

(22) Filed: Jun. 30, 2015

(65) Prior Publication Data

US 2016/0290120 A1 Oct. 6, 2016

Related U.S. Application Data

(60) Provisional application No. 62/140,057, filed on Mar. 30, 2015.

(51) Int. Cl.
*E21B 44/04* (2006.01)
*E21B 19/08* (2006.01)
*E21B 44/02* (2006.01)
*E21B 3/02* (2006.01)
*E21B 19/083* (2006.01)
*G05B 15/02* (2006.01)

(52) U.S. Cl.
CPC ............... *E21B 44/04* (2013.01); *E21B 3/02* (2013.01); *E21B 19/08* (2013.01); *E21B 19/083* (2013.01); *E21B 44/02* (2013.01); *G05B 15/02* (2013.01)

(58) Field of Classification Search
CPC .......... E21B 19/16; E21B 19/06; E21B 19/07; E21B 19/00; E21B 19/163; E21B 3/06; E21B 44/04; E21B 19/08; E21B 44/02; E21B 3/02; E21B 19/083; G05B 15/02
See application file for complete search history.

(56) References Cited

U.S. PATENT DOCUMENTS

| | | | | |
|---|---|---|---|---|
| RE28,218 E | * | 10/1974 | Hanes | E21B 19/09 175/27 |
| 4,715,451 A | * | 12/1987 | Bseisu | E21B 47/0006 175/40 |
| 4,722,389 A | * | 2/1988 | Arnold | E21B 33/05 166/285 |
| 6,791,469 B1 | * | 9/2004 | Rao | E21B 47/00 175/26 |
| 6,994,172 B2 | | 2/2006 | Ray | |
| 7,748,474 B2 | * | 7/2010 | Watkins | E21B 28/00 175/40 |

(Continued)

OTHER PUBLICATIONS

Teale, R. "The Concept of Specific Energy in Rock Drilling," Intl. J. Rock Mech. Mining Sci (1965) 2,pp. 57-73.

*Primary Examiner* — David J Bagnell
*Assistant Examiner* — Jonathan Malikasim
(74) *Attorney, Agent, or Firm* — Rachel E. Greene

(57) ABSTRACT

A system and method for controlling drilling of a wellbore. The method may include supporting a tubular string using a top drive connected to a block, and lowering the top drive by lowering the block. The method may also include adjusting a position of the tubular string relative to the block using an actuator coupled with the top drive, the block, or both.

14 Claims, 5 Drawing Sheets

(56) References Cited

U.S. PATENT DOCUMENTS

| | | | |
|---|---|---|---|
| 8,210,268 B2* | 7/2012 | Heidecke | E21B 3/02 166/380 |
| 8,688,382 B2* | 4/2014 | Spencer | E21B 47/00 175/56 |
| 8,939,234 B2* | 1/2015 | Mebane, III | E21B 44/02 175/57 |
| 2002/0074132 A1 | 6/2002 | Juhasz et al. | |
| 2006/0000601 A1 | 1/2006 | Pietras | |
| 2006/0000643 A1 | 1/2006 | Jenkins | |
| 2006/0054315 A1* | 3/2006 | Newman | E21B 19/22 166/249 |
| 2013/0146360 A1* | 6/2013 | Yajure | E21B 7/24 175/55 |
| 2014/0000912 A1 | 1/2014 | Bowley et al. | |

* cited by examiner

DRILLING CONTROL SYSTEM AND METHOD WITH ACTUATOR COUPLED WITH TOP DRIVE OR BLOCK OR BOTH

CROSS-REFERENCE TO RELATED APPLICATIONS

This application claims priority to U.S. Provisional Patent Application Ser. No. 62/140,057, which was filed Mar. 30, 2015, and is incorporated herein by reference in its entirety.

BACKGROUND

Top drives are used to suspend and rotate a string of drill pipe and/or casing in drilling applications. The top drive is supported by a drilling line wrapped on a set of sheaves and connected to drawworks at one extremity. The top drive supports the drill string via a thrust bearing. Mud may be pumped into the drill string via a swivel. Furthermore, the top drive generally includes one or more motors (electric or hydraulic) which generate(s) the rotation of the drill string. The reaction torque applied to the top drive may be transmitted to the mast via a set of rollers attached to the top-drive chassis.

Various measurements may be used to manage the drilling process, including those that involve the top drive. Hook load and hook elevation above the rig floor are two examples of such measurements. These measurements may be employed to calculate drilling parameters such as weight on bit (WOB), rate of penetration (ROP), and depth. A variety of other types of measurements are used to calculate these and other drilling parameters.

Automated control of drilling operations may be employed in connection with the top drive. Such automation may improve the rate of penetration, reduce stick and slip, and reduce damage to the bottom hole assembly (BHA). There may be three main parameters that are available for the driller to affect the drilling operation, namely: revolutions per minute (RPM), block velocity, and flow rate. The RPM may be controlled by adjusting the top drive, the block velocity may be controlled through the drawworks, and flow rate may be controlled through the pump. Automated drilling may depend on controlling the drawworks, for example, to maintain a constant WOB or ROP. However, the drill line may be a highly-damped system, making fine control of the block velocity difficult to accomplish.

SUMMARY

Embodiments of the disclosure may provide a method for controlling drilling of a wellbore. The method may include supporting a tubular string using a top drive connected to a block, and lowering the top drive by lowering the block. The method may also include adjusting a position of the tubular string relative to the block using an actuator coupled with the top drive, the block, or both.

Embodiments of the disclosure may also provide a rig system including a block coupled with a drill line. The block is vertically movable by moving the drill line. The system also includes a top drive coupled with the block such that moving the block causes the top drive to move. The top drive is configured to rotate a tubular string and support the tubular string when the tubular string is deployed into a wellbore. The system also includes an actuator coupled with the top drive or with the block. The actuator is actuatable to move the tubular string supported by the top drive relative to the block.

Embodiments of the disclosure may further provide a computing system for a drilling rig. The system may include one or more processors, and a memory system including one or more non-transitory, computer-readable media storing instructions that, when executed by at least one of the one or more processors, cause the drilling rig, the computing system, or both to perform operations. The operations include supporting a tubular string using a top drive connected to a block, lowering the top drive by lowering the block, and adjusting a position of the tubular string relative to the block using an actuator coupled with the top drive, the block, or both.

The foregoing summary is provided to introduce a subset of the features discussed in greater detail below. Thus, this summary should not be considered exhaustive or limiting on the disclosed embodiments or the appended claims.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
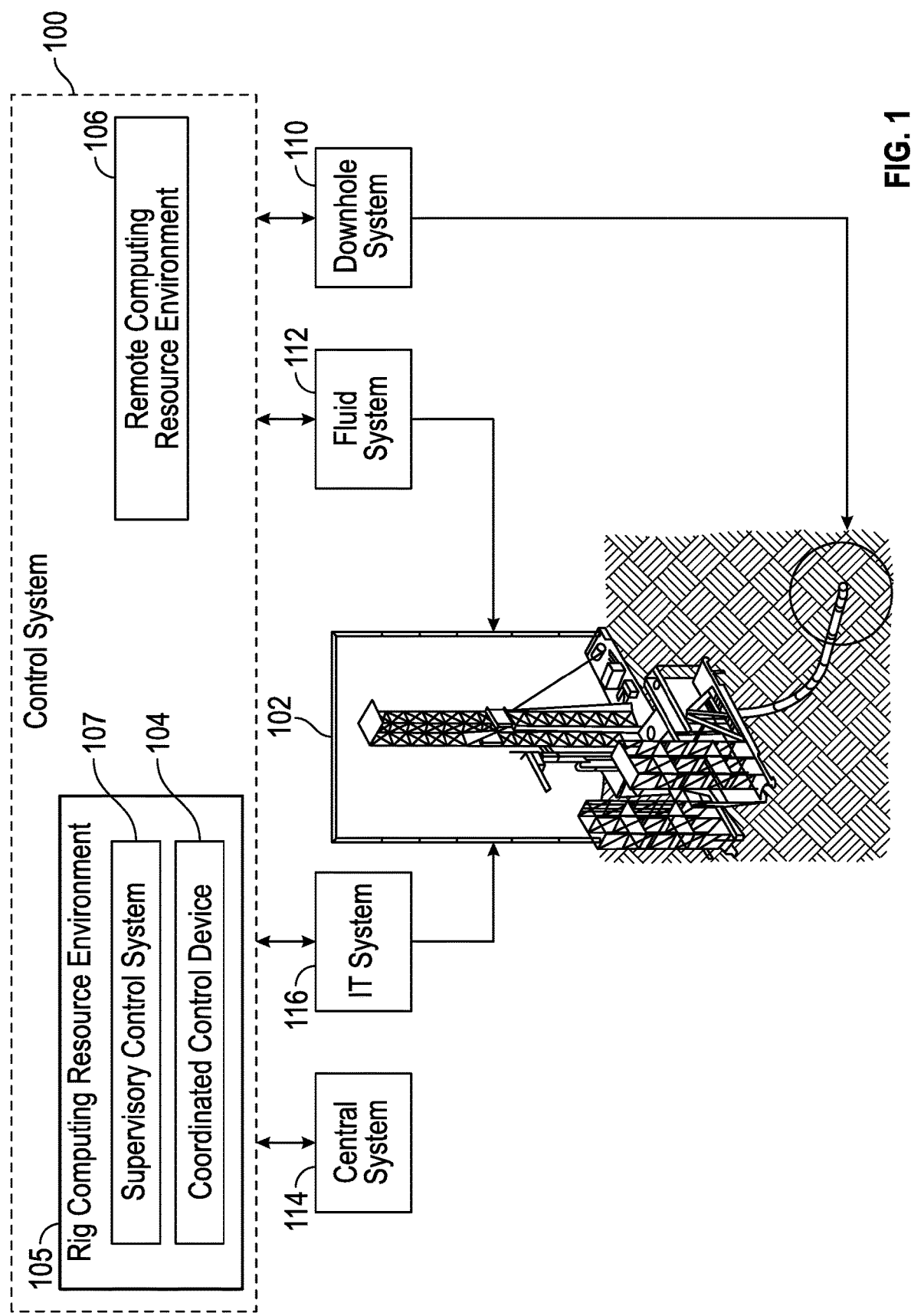
FIG. 1 illustrates a schematic view of a drilling rig and a control system, according to an embodiment.

FIG. 1 illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection).

Further, the drilling rig 102 may include various systems with different sensors and equipment for performing operations of the drilling rig 102, and may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 1. For example, the drilling rig 102 may include a downhole system 110, a fluid system 112, and a central system 114. In some embodiments, the drilling rig 102 may include an information technology (IT) system 116. The downhole system 110 may include, for example, a bottomhole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drives, rotary tables, kellys, drawworks, pumps, generators, tubular handling equipment, derricks, masts, substructures, and other suitable equipment. Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The control system 100, e.g., via the coordinated control device 104 of the rig computing resource environment 105, may monitor sensors from multiple systems of the drilling rig 102 and provide control commands to multiple systems of the drilling rig 102, such that sensor data from multiple systems may be used to provide control commands to the different systems of the drilling rig 102. For example, the system 100 may collect temporally and depth aligned surface data and downhole data from the drilling rig 102 and store the collected data for access onsite at the drilling rig 102 or offsite via the rig computing resource environment 105. Thus, the system 100 may provide monitoring capability. Additionally, the control system 100 may include supervisory control via the supervisory control system 107.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, etc.). An embodiment of the control system 100 that is unified, may, however, provide control over the drilling rig 102 and its related systems (e.g., the downhole system 110, fluid system 112, and/or central system 114).

Figure 2:
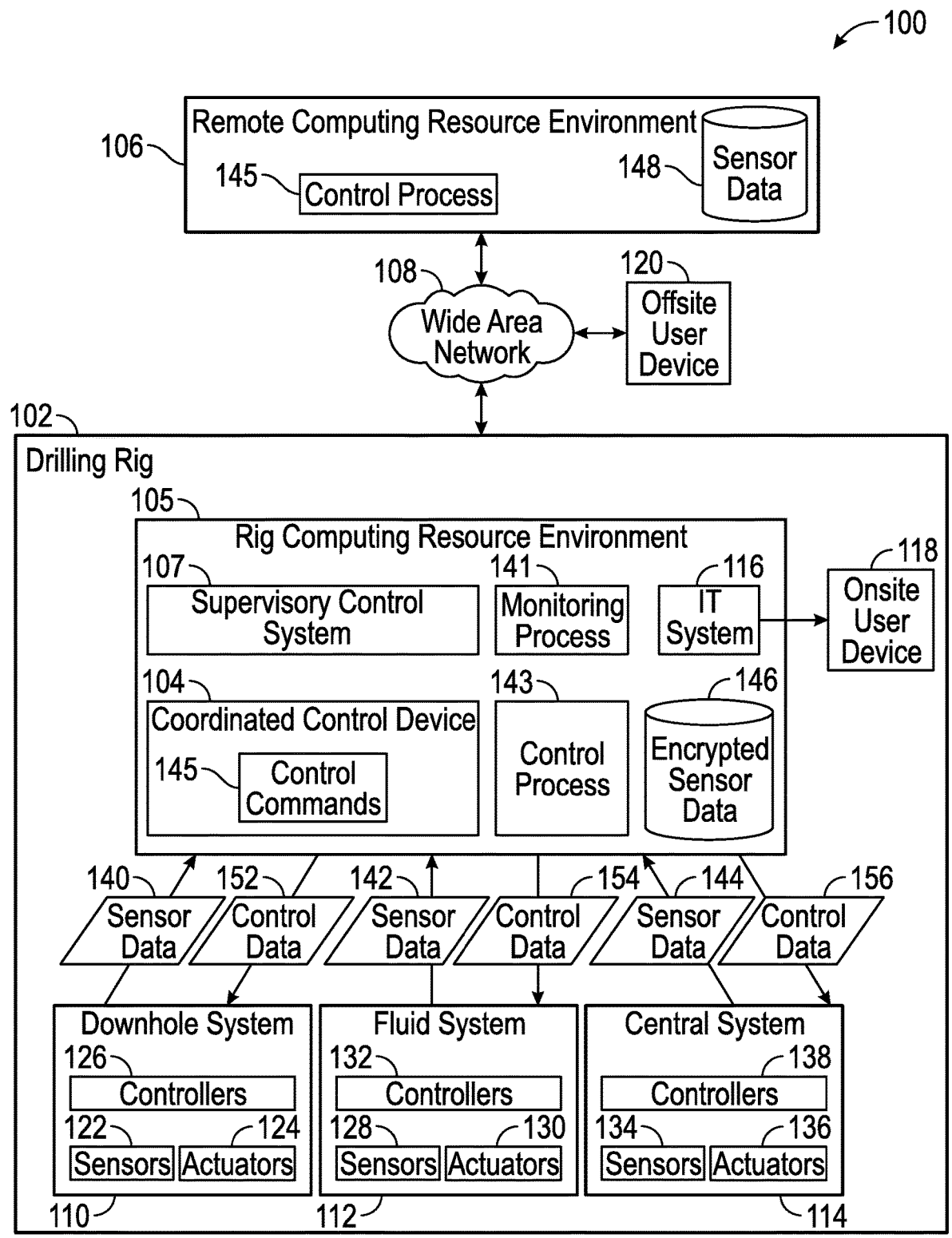
FIG. 2 illustrates a schematic view of a drilling rig and a remote computing resource environment, according to an embodiment.

FIG. 2 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 2 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The systems of the drilling rig 102 may include various sensors, actuators, and controllers (e.g., programmable logic controllers (PLCs)). For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

Acquiring the sensor data at the coordinated control device 104 may facilitate measurement of the same physical properties at different locations of the drilling rig 102. In some embodiments, measurement of the same physical properties may be used for measurement redundancy to enable continued operation of the well. In yet another embodiment, measurements of the same physical properties at different locations may be used for detecting equipment conditions among different physical locations. The variation in measurements at different locations over time may be used to determine equipment performance, system performance, scheduled maintenance due dates, and the like. For example, slip status (e.g., in or out) may be acquired from the sensors and provided to the rig computing resource environment 105. In another example, acquisition of fluid samples may be measured by a sensor and related with bit depth and time measured by other sensors. Acquisition of data from a camera sensor may facilitate detection of arrival and/or installation of materials or equipment in the drilling rig 102. The time of arrival and/or installation of materials or equipment may be used to evaluate degradation of a material, scheduled maintenance of equipment, and other evaluations.

The coordinated control device 104 may facilitate control of individual systems (e.g., the central system 114, the downhole system, or fluid system 112, etc.) at the level of each individual system. For example, in the fluid system 112, sensor data 128 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g. tripping speed). When it is desired to maintain certain downhole pressure during tripping, the coordinated control device 104 may be used to direct the appropriate control commands.

In some embodiments, control of the various systems of the drilling rig 102 may be provided via a three-tier control system that includes a first tier of the controllers 126, 132, and 138, a second tier of the coordinated control device 104, and a third tier of the supervisory control system 107. In other embodiments, coordinated control may be provided by one or more controllers of one or more of the drilling rig systems 110, 112, and 114 without the use of a coordinated control device 104. In such embodiments, the rig computing resource environment 105 may provide control processes directly to these controllers for coordinated control. For example, in some embodiments, the controllers 126 and the controllers 132 may be used for coordinated control of multiple systems of the drilling rig 102.

The sensor data 140, 142, and 144 may be received by the coordinated control device 104 and used for control of the drilling rig 102 and the drilling rig systems 110, 112, and 114. In some embodiments, the sensor data 140, 142, and 144 may be encrypted to produce encrypted sensor data 146. For example, in some embodiments, the rig computing resource environment 105 may encrypt sensor data from different types of sensors and systems to produce a set of encrypted sensor data 146. Thus, the encrypted sensor data 146 may not be viewable by unauthorized user devices (either offsite or onsite user device) if such devices gain access to one or more networks of the drilling rig 102. The encrypted sensor data 146 may include a timestamp and an aligned drilling parameter (e.g., depth) as discussed above. The encrypted sensor data 146 may be sent to the remote computing resource environment 106 via the network 108 and stored as encrypted sensor data 148.

The rig computing resource environment 105 may provide the encrypted sensor data 148 available for viewing and processing offsite, such as via offsite user devices 120. Access to the encrypted sensor data 148 may be restricted via access control implemented in the rig computing resource environment 105. In some embodiments, the encrypted sensor data 148 may be provided in real-time to offsite user devices 120 such that offsite personnel may view real-time status of the drilling rig 102 and provide feedback based on the real-time sensor data. For example, different portions of the encrypted sensor data 146 may be sent to offsite user devices 120. In some embodiments, encrypted sensor data may be decrypted by the rig computing resource environment 105 before transmission or decrypted on an offsite user device after encrypted sensor data is received.

The offsite user device 120 may include a thin client configured to display data received from the rig computing resource environment 105 and/or the remote computing resource environment 106. For example, multiple types of thin clients (e.g., devices with display capability and minimal processing capability) may be used for certain functions or for viewing various sensor data.

The rig computing resource environment 105 may include various computing resources used for monitoring and controlling operations such as one or more computers having a processor and a memory. For example, the coordinated control device 104 may include a computer having a processor and memory for processing sensor data, storing sensor data, and issuing control commands responsive to sensor data. As noted above, the coordinated control device 104 may control various operations of the various systems of the drilling rig 102 via analysis of sensor data from one or more drilling rig systems (e.g. 110, 112, 114) to enable coordinated control between each system of the drilling rig 102. The coordinated control device 104 may execute control commands 150 for control of the various systems of the drilling rig 102 (e.g., drilling rig systems 110, 112, 114). The coordinated control device 104 may send control data determined by the execution of the control commands 150 to one or more systems of the drilling rig 102. For example, control data 152 may be sent to the downhole system 110, control data 154 may be sent to the fluid system 112, and control data 154 may be sent to the central system 114. The control data may include, for example, operator commands (e.g., turn on or off a pump, switch on or off a valve, update a physical property setpoint, etc.). In some embodiments, the coordinated control device 104 may include a fast control loop that directly obtains sensor data 140, 142, and 144 and executes, for example, a control algorithm. In some embodiments, the coordinated control device 104 may include a slow control loop that obtains data via the rig computing resource environment 105 to generate control commands.

In some embodiments, the coordinated control device 104 may intermediate between the supervisory control system 107 and the controllers 126, 132, and 138 of the systems 110, 112, and 114. For example, in such embodiments, a supervisory control system 107 may be used to control systems of the drilling rig 102. The supervisory control system 107 may include, for example, devices for entering control commands to perform operations of systems of the drilling rig 102. In some embodiments, the coordinated control device 104 may receive commands from the supervisory control system 107, process the commands according to a rule (e.g., an algorithm based upon the laws of physics for drilling operations), and/or control processes received from the rig computing resource environment 105, and provides control data to one or more systems of the drilling rig 102. In some embodiments, the supervisory control system 107 may be provided by and/or controlled by a third party. In such embodiments, the coordinated control device 104 may coordinate control between discrete supervisory control systems and the systems 110, 112, and 114 while using control commands that may be optimized from the sensor data received from the systems 110 112, and 114 and analyzed via the rig computing resource environment 105.

The rig computing resource environment 105 may include a monitoring process 141 that may use sensor data to determine information about the drilling rig 102. For example, in some embodiments the monitoring process 141 may determine a drilling state, equipment health, system health, a maintenance schedule, or any combination thereof. In some embodiments, the rig computing resource environment 105 may include control processes 143 that may use the sensor data 146 to optimize drilling operations, such as, for example, the control of drilling equipment to improve drilling efficiency, equipment reliability, and the like. For example, in some embodiments the acquired sensor data may be used to derive a noise cancellation scheme to improve electromagnetic and mud pulse telemetry signal processing. The control processes 143 may be implemented via, for example, a control algorithm, a computer program, firmware, or other suitable hardware and/or software. In some embodiments, the remote computing resource environment 106 may include a control process 145 that may be provided to the rig computing resource environment 105.

The rig computing resource environment 105 may include various computing resources, such as, for example, a single computer or multiple computers. In some embodiments, the rig computing resource environment 105 may include a virtual computer system and a virtual database or other virtual structure for collected data. The virtual computer system and virtual database may include one or more resource interfaces (e.g., web interfaces) that enable the submission of application programming interface (API) calls to the various resources through a request. In addition, each of the resources may include one or more resource interfaces that enable the resources to access each other (e.g., to enable a virtual computer system of the computing resource environment to store data in or retrieve data from the database or other structure for collected data).

The virtual computer system may include a collection of computing resources configured to instantiate virtual machine instances. A user may interface with the virtual computer system via the offsite user device or, in some embodiments, the onsite user device. In some embodiments, other computer systems or computer system services may be utilized in the rig computing resource environment 105, such as a computer system or computer system service that provisions computing resources on dedicated or shared computers/servers and/or other physical devices. In some embodiments, the rig computing resource environment 105 may include a single server (in a discrete hardware component or as a virtual server) or multiple servers (e.g., web servers, application servers, or other servers). The servers may be, for example, computers arranged in any physical and/or virtual configuration In some embodiments, the rig computing resource environment 105 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 118 and/or offsite user device 120) accessing the rig computing resource environment 105. In some embodiments, the remote computing resource environment 106 may include similar computing resources to those described above, such as a single computer or multiple computers (in discrete hardware components or virtual computer systems).

Figure 3:
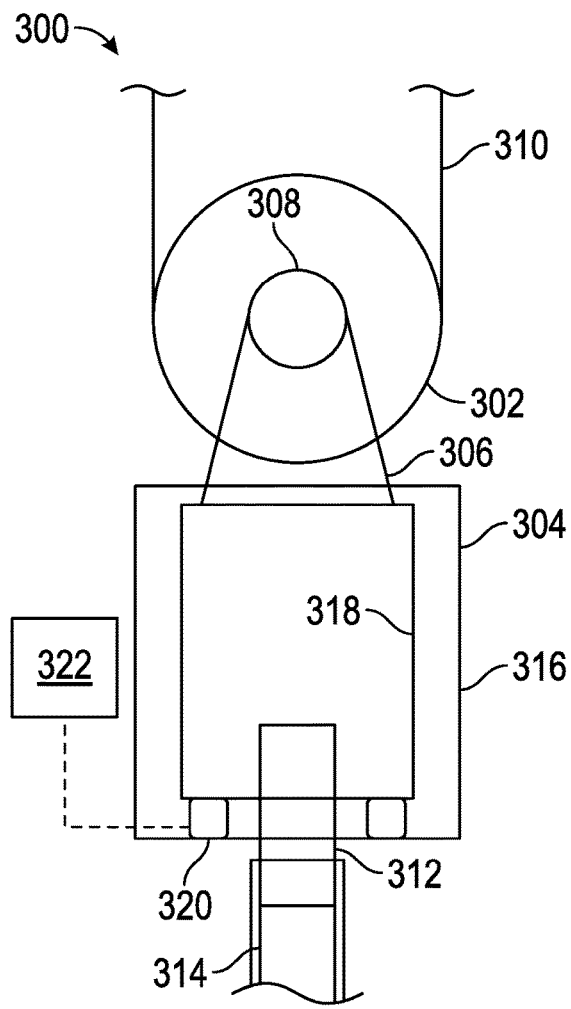
FIG. 3 illustrates a conceptual, side, schematic view of a drilling rig system, according to an embodiment.

FIG. 3 illustrates a conceptual, side, schematic of a drilling rig system 300, according to an embodiment. The rig system 300 may include a block 302 and a top drive 304. The top drive 304 may be suspended from the block 302 by a mechanical member 306 or another type of supporting structure, which may in turn be coupled to a support member 308 of the block 302. The block 302 may be generally known in the art as a travelling block, and may be movable vertically using a drawworks. For example, the drawworks may include one or more spools, to which a drill line 310 is attached. The spools may be used to reel the drill line 310 in or let it out, thereby adjusting the elevation of the block 302. In turn, the block 302 may include one or more sheaves, which may receive and roll along the drill line 310, similar to a block-and-tackle arrangement.

The top drive 304 may include a quill shaft 312, which may be coupled with a tubular string 314. The tubular string 314 may be one or more drill pipes connected together (i.e., "made up") end-on-end. The quill shaft 312 may be rotated by a motor contained in the top drive 304, and may transmit such rotation to the tubular string 314. Further, the top drive 304 may be supported on a mast, and the top drive 304 may transmit torque to the mast while rotating the tubular string 314. Rotation of the tubular string 314 in the wellbore may cause a bottomhole assembly, including a drill bit, to rotate and thereby bore into the earth, while a weight on the bit (WOB) (e.g., all or a fraction of the weight of the tubular string 314) may cause the bit and the tubular string 314 to advance. In some situations, the bottomhole assembly may also include a motor (e.g., a mud motor), which may allow the drill bit to rotate independently of the tubular string 314 in a "sliding mode" of drilling, as opposed to a "rotating mode" in which the tubular string 314 is rotated by the top drive 304. The mud motor may also be active while the top drive 304 is rotating the tubular string 314.

In the illustrated embodiment, the top drive 304 includes a first or "outer" frame 316 and a second or "inner" frame 318. The quill shaft 312 may be received through the outer frame 316 and into the inner frame 318. The weight incident on the quill shaft 312 (e.g., the weight of the tubular string 314 not supported by the bit or the wellbore, generally referred to as the "hookload") may be transmitted to the inner frame 318 via one or more thrust bearings, thereby allowing the quill shaft 312 to rotate relative to the inner frame 318.

The top drive 304 may also include one or more actuators 320. For example, as shown in FIG. 3, the actuator 320 may be disposed between the inner frame 318 and the outer frame 316. In an embodiment, the actuator 320 may be configured to transmit at least some of the hookload from the inner frame 318 to the outer frame 316.

Further, the actuator 320 may be configured to expand or contract on demand. For example, the actuator 320 may be or include a hydraulic cylinder, a piezoelectric actuator, a gear drive with a motor, etc. The actuator 320 may be adjustable so as to adjust a distance between a portion of the inner frame 318 and a portion of the outer frame 316. In the illustrated embodiment, the actuator 320 may be vertically expandable, such that by expanding, the actuator 320 may increase the distance between the bottom of the inner frame 318 and the bottom of the outer frame 316, and decrease the distance by contracting. In other embodiments, however, the actuator 320 may be positioned elsewhere in the top drive 304, e.g., between the top of the inner frame 318 and the top of the outer frame 318, along the sides, etc. In various embodiments, the actuator 320 may allow the tubular string 314 to move relative to the block 302 and/or relative to the drill line 310, e.g., without raising or lowering the block 302 using the drawworks. Furthermore, the actuator may contain a load sensor to measure the load transfer between the inner frame and the outer frame.

The actuator 320 may be coupled with and in communication with a controller 322, e.g., wirelessly or via one or more communication and/or power lines. The controller 322 may be or include any suitable type of processor or programmable logic controller. The controller 322 may also be coupled with the drawworks, the block 302, the top drive 304, or any other part of the rig system 300. Further, the controller 322 may be configured to cause the rig system 300, including the actuators 320, to perform operations, which will be described below.

Figure 4:
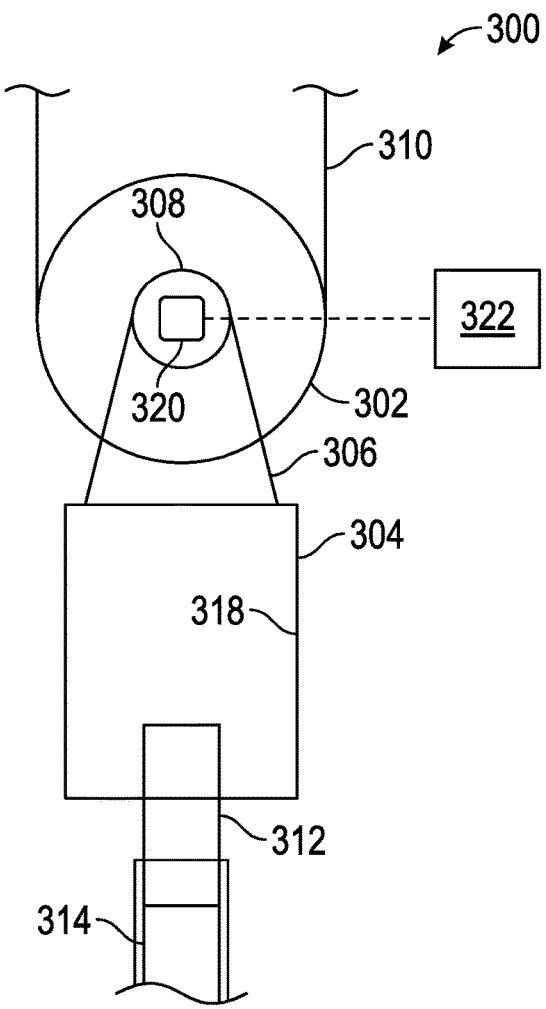
FIG. 4 illustrates a conceptual, side, schematic view of a drilling rig system, according to another embodiment.

FIG. 4 illustrates a conceptual, side, schematic view of another embodiment of the rig system 300. In this embodiment, the actuator 320 may be positioned on the block 302, in particular, at the support member 308 that connects with the mechanical member 306. For example, the support member 308 may be configured to be moved vertically with respect to the remainder of the block 302. The actuator 320 may be configured to effect such movement, e.g., via hydraulics, gear drives, piezoelectric actuators, cams, etc. Moving the support member 308 may cause the top drive 304 to move relative to the block 302. In other words, the tubular string 314 connected to the top drive 304 may be moved independently of the drawworks by actuation of the actuator 320.

In the embodiment of FIG. 4, the outer frame 316 (shown in FIG. 3) is omitted, based on the changed location of the actuator 320. In such case, the inner frame 318 may support the quill shaft 312 (and thus the hookload), and be coupled with the block 302 via the mechanical member 306 and support member 308. However, in some embodiments, two actuators 320 may be provided, one in each of the positions thereof in FIGS. 3 and 4. In such an embodiment, the outer frame 316 may be employed as discussed above with respect to FIG. 3.

Figure 5:
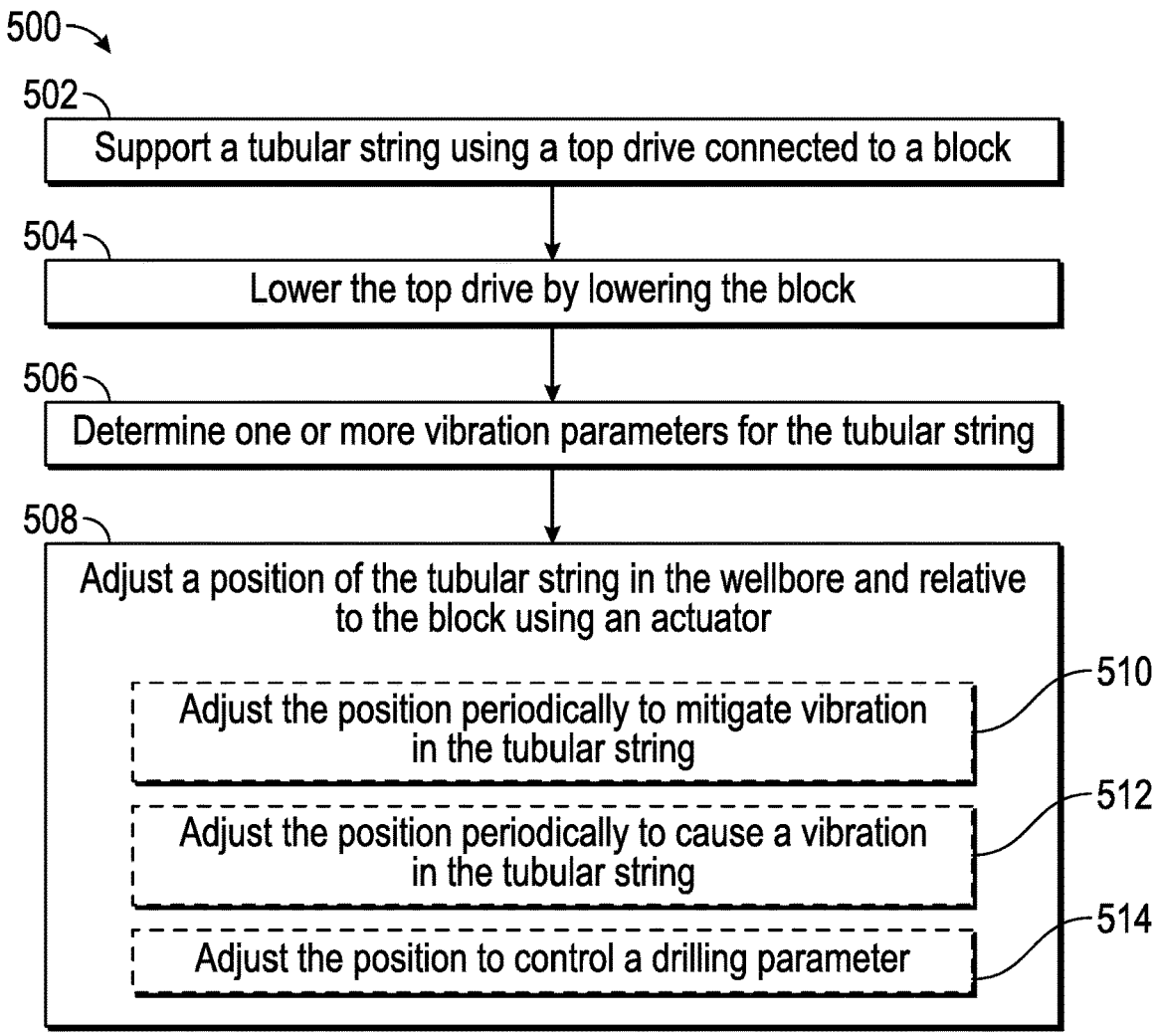
FIG. 5 illustrates a flowchart of a method for controlling drilling of a wellbore, according to an embodiment.

FIG. 5 illustrates a flowchart of a method 500 for controlling drilling in a wellbore, according to an embodiment. The method 500 may proceed by operation of the rig system 300 discussed above with respect to FIGS. 3 and/or 4, and thus is described herein with reference thereto. However, it will be appreciated that, in some embodiments, the method 500 may be performed using other systems. Further, in some embodiments, the method 500 may be executed partially or entirely by the controller 322, which may be configured (e.g., programmed) to execute one or more aspects of the method 500.

The method 500 may include supporting the tubular string 314 using the top drive 304 connected to the block 302, as at 502. The block 302 may be supported and movable by a drawworks, which may be configured to adjust a free (unspooled) length of the drill line 310 coupled with the block 302. As such, the top drive 304 may be raised or lowered by lowering the block 302, as at 504. The controller 322 may be employed to control or otherwise monitor the elevation change of the block 302.

The method 500 may also include determining one or more vibration parameters for the tubular string 314, as at 506. In many drilling applications, the drilling operations cause the tubular string 314 or the bottomhole assembly to vibrate. Some such vibration parameters may indicate undesired conditions, such as stick-slip or the like. Accordingly, in determining the one or more vibration parameters, the method 500 at 506 may include determining a certain vibration condition (e.g., stick-slip) based on the vibration parameters.

Various examples of such determining may include detecting a frequency spectrum, amplitude, waveform, etc. of vibration that may propagate along the tubular string 314, e.g., using a vibration sensor. Determining may also or instead include a processor (e.g., in the controller 322) calculating one or more vibration frequencies based on drilling parameters and physical characteristics of the tubular string 314. In still further embodiments, determining the vibration parameters may include determining a frequency and/or amplitude for a second vibration that, if propagated along the tubular string 314, would mitigate the vibration in the tubular string 314 caused by the drilling operations. In another embodiment, determining may include determining a vibration frequency that reduces frictional (drag) forces between the tubular string 314 and the wellbore.

The method 500 may also include adjusting a position of the tubular string 314 in the wellbore and relative to the block 302 using the actuator 320, as at 508. The adjustment may include an adjustment to an elevation and/or to a horizontal position of the tubular string 314, e.g., at least the at the end thereof that is coupled with the quill shaft 312. Such adjustment may be effected by the controller 322 signaling to and/or providing power to the actuator 320, causing the actuator 320 to expand, contract, or otherwise quickly (relative to the speed at which the drawworks moves) move the tubular string 314 relative to the block 302. The actuator 320 may be positioned on the block 302 and/or between two relatively movable frames 316, 318 of the top drive 304, as described above. Thus, in some cases, the top drive 304 as a whole may not move relative to the block 302 (e.g., FIG. 3), while in other cases it may (e.g., FIG. 4), but in both cases the position of the tubular string 314 may be changed relative to the block 302.

This adjustment of the position of the tubular string 314 may take several forms. For example, the position may be adjusted periodically (i.e., at a particular frequency) to mitigate vibration in the tubular string, as at 510. This periodic movement may be based on the vibration frequency or frequencies determined at 506 (e.g., for the certain vibration condition). In another example, adjusting the position of the tubular string 314 using the actuator 320 may cause a vibration (rather than mitigate a vibration) in the tubular string 314. This may be configured to reduce drag forces on the tubular string 314 in the wellbore.

In still another embodiment, the position adjustment at 508 may be employed to control a drilling parameter, as at 514. Torque, weight on bit, rate of penetration, and mechanical specific energy (MSE) are several examples of the drilling parameter that may be controlled, for example, maintained at a generally constant value. Considering MSE as the drilling parameter, the adjustment at 508 may be configured to maintain a generally constant MSE of the tubular string 314 in the wellbore.

Figure 6:
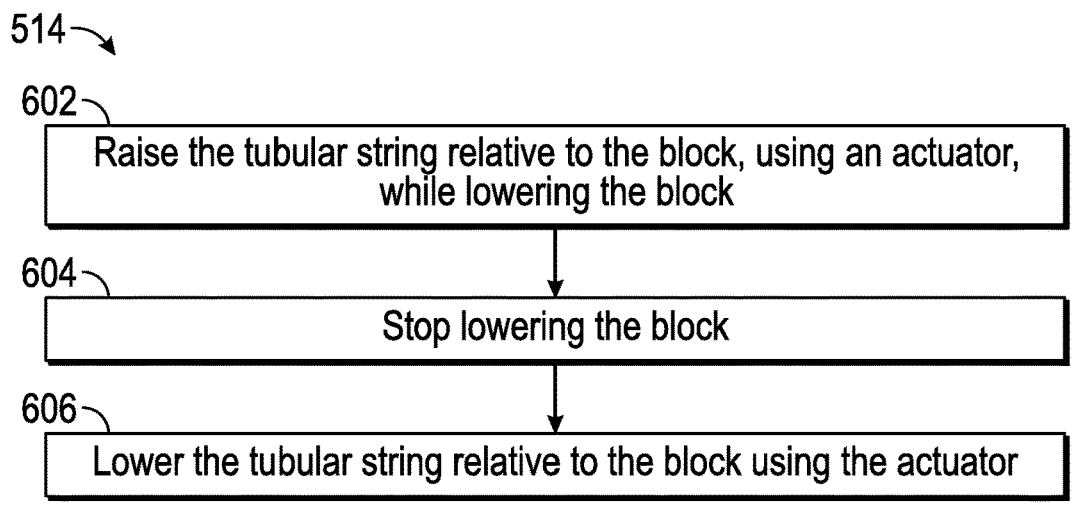
FIG. 6 illustrates a flowchart of a process for maintaining a generally constant mechanical specific energy, e.g., as part of the method of FIG. 5, according to an embodiment.

FIG. 6 illustrates a flowchart of an embodiment of maintaining the generally constant drilling parameter using the actuator 320. Controlling the drilling parameter at 514 may include raising the tubular string 314 relative to the block 302, using the actuator 320, while lowering the block 302 (as at 504, as at 602). Thus, the actuator 320 may, for example, expand or contract in coordination with the raising or the lowering of the block 302. For example, when the actuator 320 reaches its contraction limit, the lowering of the block 302 may be stopped, as at 604, or at least slowed. The tubular string 314 may then be lowered relative to the block 302 by operation (e.g., expansion) of the actuator 320, as at 606.

Figure 7:
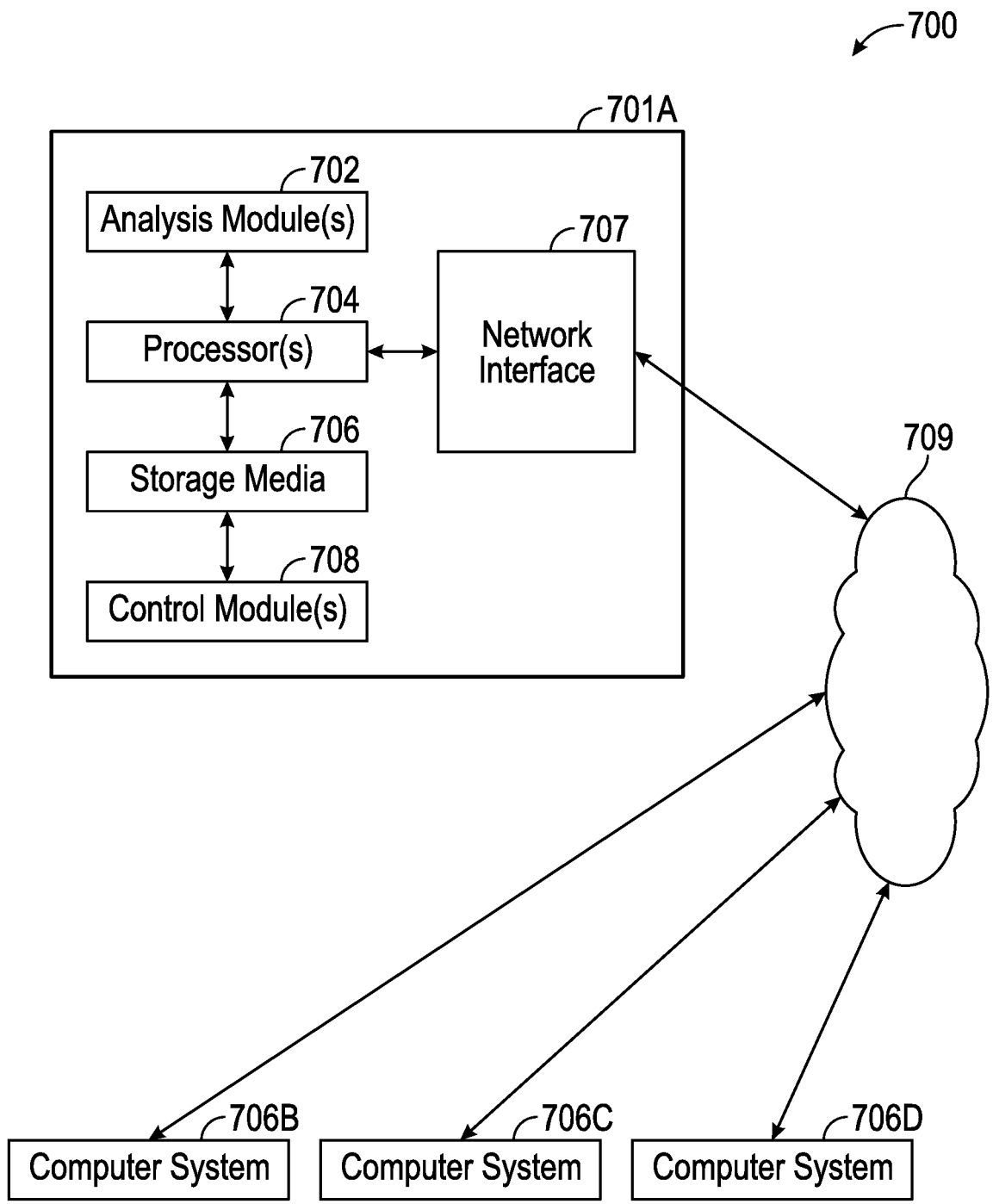
FIG. 7 illustrates a schematic view of a computing system, according to an embodiment.

Since the actuator 320 may be less damped and have a quicker response time than the drawworks and the drill line 310, the lowering of the tubular string 314 by the actuator 320 may provide a more precise control of the drilling parameter, e.g., MSE. To control the MSE, the MSE may be intermittently or continuously calculated, e.g., by the controller 322. The MSE may be described as $$E_s = \frac{WOB}{A_b} + \frac{120\pi NT}{A_b ROP}$$

where WOB is weight on bit, ROP is rate of penetration, $A_b$ is bit cross sectional area, N is speed (revolutions per minute), and T is torque. The WOB and ROP may be calculated or measured using any suitable technique. Further, the precision control of the tubular string 314 position may be employed to achieve greater control over the WOB, ROP, and/or other drilling parameters. Moreover, as discussed above, the actuator 320 may be employed to control vibrations within the tubular string 314, either to create the oscillations In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURRY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 700 contains one or more rig control module(s) 708. In the example of computing system 700, computer system 701A includes the rig control module 708. In some embodiments, a single rig control module may be used to perform some or all aspects of one or more embodiments of the methods disclosed herein. In alternate embodiments, a plurality of rig control modules may be used to perform some or all aspects of methods herein.

The computing system 700 is one example of a computing system; in other examples, the computing system 700 may have more or fewer components than shown, may combine additional components not depicted in the example embodiment of FIG. 7, and/or the computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for controlling drilling of a wellbore, comprising:
   supporting a tubular string using a top drive connected to a block;
   lowering the top drive by lowering the block; and
   adjusting a position of the tubular string relative to the block using an actuator coupled with the top drive, the block, or both, wherein adjusting the position comprises:
      determining that a vibration condition exists in the tubular string; and
      adjusting the position of the tubular string periodically using the actuator, to mitigate a vibration in the tubular string.

2. The method of claim 1, wherein adjusting the position comprises maintaining one or more drilling parameters at a generally constant value, the one or more drilling parameters selected from the group consisting of: weight on bit, rate of penetration, torque, and mechanical specific energy.

3. The method of claim 1, wherein adjusting the position comprises:
   raising the tubular string relative to the block, using the actuator, while lowering the block;
   slowing or stopping the lowering of the block; and
   lowering the tubular string relative to the block using the actuator, after slowing or stopping the lowering of the block.

4. The method of claim 1, wherein the top drive comprises an inner frame and an outer frame, wherein the actuator is positioned between the inner and outer frames, and wherein adjusting the position comprises changing a distance between two surfaces of the inner and outer frames using the actuator.

5. The method of claim 1, wherein adjusting the position comprises adjusting a position of the top drive relative to the block using the actuator.

6. A vibration-mitigating rig system, comprising:
   a block coupled with a drill line, wherein the block is vertically movable by moving the drill line;
   a top drive coupled with the block such that moving the block causes the top drive to move, wherein the top drive is configured to rotate a tubular string and support the tubular string when the tubular string is deployed into a wellbore; and
   an actuator coupled with the top drive or with the block, wherein the actuator is actuatable to periodically move the tubular string supported by the top drive relative to the block, so as to mitigate a vibration condition in the tubular string.

7. The rig system of claim 6, wherein the top drive comprises a first frame configured to support a weight of the tubular string, and a second frame coupled with the block, the actuator being configured to adjust a distance between the first and second frames.

8. The rig system of claim 6, wherein the actuator is configured to move the top drive relative to the block.

9. The rig system of claim 6, further comprising a controller in communication with the actuator, wherein the controller is configured to determine a vibration condition in the tubular string and actuate the actuator to mitigate the vibration condition.

10. A computing system for a drilling rig, comprising:
    one or more processors; and
    a memory system comprising one or more non-transitory, computer-readable media storing instructions that, when executed by at least one of the one or more processors, cause the drilling rig, the computing system, or both to perform operations, the operations comprising:
       supporting a tubular string using a top drive connected to a block;
       lowering the top drive by lowering the block; and
       adjusting a position of the tubular string relative to the block using an actuator coupled with the top drive, the block, or both, wherein adjusting the position comprises:
          determining that a vibration condition exists in the tubular string; and
          adjusting the position of the tubular string periodically using the actuator, to mitigate a vibration in the tubular string.

11. The system of claim 10, wherein adjusting the position comprises maintaining one or more drilling parameters at a generally constant value, the one or more drilling parameters selected from the group consisting of: weight on bit, rate of penetration, torque, and mechanical specific energy.

12. The system of claim 10, wherein adjusting the position comprises:
    raising the tubular string relative to the block, using the actuator, while lowering the block;
    slowing or stopping the lowering of the block; and
    lowering the tubular string relative to the block using the actuator, after slowing or stopping the lowering of the block.

13. The system of claim 10, wherein the actuator is positioned between an inner frame of the top drive and an outer frame thereof, and wherein the inner frame is coupled with the tubular string and the outer frame is coupled with the block.

14. The system of claim 10, wherein the actuator is configured to adjust a position of the top drive relative to the block.

* * * * *